(12) United States Patent
Mukai et al.

(10) Patent No.: US 9,110,662 B2
(45) Date of Patent: Aug. 18, 2015

(54) TEMPERATURE CONTROLLER

(75) Inventors: Atsushi Mukai, Kyoto (JP); Hirofumi Hosokawa, Moriyama (JP); Yutaka Tomiki, Kusatsu (JP); Nobuhiko Negishi, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 13/381,024

(22) PCT Filed: Mar. 16, 2011

(86) PCT No.: PCT/JP2011/056149
§ 371 (c)(1),
(2), (4) Date: Feb. 7, 2012

(87) PCT Pub. No.: WO2012/073529
PCT Pub. Date: Jun. 7, 2012

(65) Prior Publication Data
US 2013/0238924 A1 Sep. 12, 2013

(30) Foreign Application Priority Data

Nov. 29, 2010 (JP) ................................. 2010-265059

(51) Int. Cl.
*G06F 1/00* (2006.01)
*G06F 1/32* (2006.01)
*G05D 23/22* (2006.01)

(52) U.S. Cl.
CPC .............. *G06F 1/3206* (2013.01); *G05D 23/22* (2013.01)

(58) Field of Classification Search
CPC ........... G06F 1/26; G06F 1/263; G06F 1/266; G06F 1/3206

USPC ......................................................... 713/300
See application file for complete search history.

(56) References Cited

U.S. PATENT DOCUMENTS 6,253,329 B1 * 6/2001 Kang ............................. 713/300
6,882,942 B1   4/2005 Duduman
6,963,933 B2 * 11/2005 Saito et al. ......................... 710/1
(Continued)

FOREIGN PATENT DOCUMENTS

CN 101803187 A 8/2010
JP 05-241477 A 9/1993
(Continued)

OTHER PUBLICATIONS

Extended European search report issued on Nov. 6, 2014 in the counterpart European patent application.
(Continued)

*Primary Examiner* — Mark Connolly
(74) *Attorney, Agent, or Firm* — Marvin A. Motsenbocker; Mots Law, PLLC

(57) ABSTRACT

A temperature controller capable of being connected to a computer is able to be stably operated at the time of being connected to the computer. The temperature controller is operated by a power source from the computer and operated by a general power source. A voltage used in the temperature controller includes a first voltage for processing a digital signal. The temperature controller includes a feedback circuit for monitoring a change in the first voltage of the temperature controller and when detecting that the first voltage exceeds a predetermined value, lowering the supply of the general power source, and the voltage of the power source supplied from the computer is smaller than the predetermined value.

18 Claims, 3 Drawing Sheets

(56) References Cited

U.S. PATENT DOCUMENTS

| | | | |
|---|---|---|---|
| 7,421,594 B2 * | 9/2008 | Nakajima et al. | 713/300 |
| 2003/0110403 A1 * | 6/2003 | Crutchfield et al. | 713/300 |
| 2007/0119960 A1 | 5/2007 | Zheng | |
| 2007/0223161 A1 | 9/2007 | Kiyozaki | |
| 2009/0127932 A1 | 5/2009 | Warren et al. | |

FOREIGN PATENT DOCUMENTS

| | | |
|---|---|---|
| JP | 07-152428 A | 6/1995 |
| JP | 2000-105638 A | 4/2000 |
| JP | 2003-219561 A | 7/2003 |
| JP | 2009-086724 A | 4/2009 |
| JP | 2009-217707 A | 9/2009 |
| KR | 10-2000-0077068 A | 12/2000 |
| KR | 10-2007-0096849 A | 10/2007 |

OTHER PUBLICATIONS

Chinese office action issued on Mar. 5, 2014 in the counterpart Chinese patent application.
Korean office action letter issued on Feb. 27, 2013 in the counterpart Korean patent application.

* cited by examiner

TEMPERATURE CONTROLLER

TECHNICAL FIELD

This disclosure relates to a temperature controller, and particularly relates to a temperature controller capable of being connected to a personal computer.

BACKGROUND ART

There is a recent USB (Universal Serial Bus) device operated by supplying a power source from a personal computer (computer) at the time of being connected to the personal computer. That is, there is a USB device operated by bus power. Such a USB device is disclosed for example in Patent Document 1 and Patent Document 2.

A USB device disclosed in Patent Document 1 is provided with two signal wires used for inputting and outputting data, a 5-V power wire, and a ground (GND) wire. By providing a switch for switching the connection and cut-off of the 5-V power wire, a power source supplied to the USB device is turned ON/OFF.

According to Patent Document 2, electric power capable of being supplied by the bus power is regulated to 5 V and 500 mA. The USB device is provided with a secondary battery for storing electric power supplied from a personal computer. When an electric current flows exceeding an upper limit of 500 mA in such a USB device, a shortage is supplied by the stored electric power.

PRIOR ART DOCUMENT

Patent Document

Patent Document 1: Japanese Unexamined Patent Publication No. 2000-105638 ([0016] to [0019])
Patent Document 2: Japanese Unexamined Patent Publication No. 2003-219561 ([0012] to [0018])

DISCLOSURE OF THE INVENTION

Problems to be Solved by the Invention

As disclosed in Patent Document 1 and Patent Document 2, as the USB device operated by the bus power, there is a temperature controller. The temperature controller is connected to a personal computer via a USB cable in order to preliminarily set information required for using the temperature controller, for example. Partial functions of the temperature controller are operated by supplying a voltage of 5 V from the personal computer.

Meanwhile, normally, in a case where the temperature controller is used on site or the like, the temperature controller is not connected to the personal computer but connected to a power point via a power cable. By supplying a voltage of 100 V of a general power source, the temperature controller steps down a voltage to 5 V for processing a digital signal and 12 V for processing an analog signal, and the above partial functions and other functions are operated by the voltage of 5 V and the voltage of 12 V.

A feedback circuit is provided in the temperature controller. The feedback circuit monitors a change in the voltage of 5 V. The feedback circuit adjusts the voltage of 5 V by facilitating supply of a power source by the general power source when the voltage of 5 V is a predetermined value or less, for example 4.9 V or less, and pausing the supply of the power source by the general power source when the voltage is larger than the predetermined value.

When the temperature controller is connected to the personal computer so as to receive the supply of the power source from the personal computer while the general power source is being supplied, the feedback circuit sometimes detects that the voltage supplied from the personal computer exceeds the predetermined value during communication with the personal computer. In this case, the feedback circuit pauses the supply of the power source from the general power source. Thus, the voltage of 12 V is lowered. Then, there is a fear that the temperature controller cannot be normally operated.

An object of an embodiment of this invention is to provide a temperature controller capable of being stably operated at the time of being connected to a personal computer.

Means for Solving the Problem

A temperature controller according to this invention is capable of being connected to a computer. The temperature controller is operated by supplying a power source from the computer and operated by supplying a general power source. A voltage used in the temperature controller includes a first voltage for processing a digital signal. The temperature controller includes a feedback circuit for monitoring a change in the first voltage flowing in the temperature controller and when detecting that the first voltage exceeds a predetermined value, lowering supply of the general power source, and a voltage of the power source supplied from the computer is smaller than the predetermined value.

Thereby, the voltage of the power source supplied from the computer is smaller than the predetermined value serving as a reference at the time of lowering the supply of the general power source by the feedback circuit. Thus, even in a case where the power source is supplied from the general power source at the time of connecting the temperature controller to the computer, the feedback circuit does not detect that the voltage of the power source supplied from the computer exceeds the predetermined value. Therefore, at the time of connecting to the computer, the feedback circuit does not lower the supply of the general power source. As a result, the temperature controller can be stably operated at the time of being connected to the computer.

A range of the first voltage may be 4.5 V or more and 5.25 V or less, and the predetermined value may be 4.9 V. The voltage of the power source supplied from the computer may be 4.5 V or more and 4.9 V or less, and a voltage of the power source supplied from the general power source may be 4.75 V or more and 5.25 or less. Thereby, a range of the voltage of the power source supplied from the computer and a range of the voltage of the power source supplied by the general power source can be clearly divided. The voltage of the power source supplied from the computer does not exceed the value of the voltage serving as the reference at the time of lowering the supply of the general power source by the feedback circuit.

Further, the voltage used in the temperature controller may include a second voltage for processing an analog signal.

EFFECT OF THE INVENTION

Thereby, the voltage of the power source supplied from the computer is smaller than the predetermined value serving as the reference at the time of lowering the supply of the general power source by the feedback circuit. Therefore, even in a case where the power source is supplied from the general power source at the time of connecting the temperature controller to the computer, the feedback circuit does not detect that the voltage of the power source supplied from the computer exceeds the predetermined value. Thus, at the time of connecting to the computer, the feedback circuit does not lower the supply of the general power source. As a result, the temperature controller can be stably operated at the time of being connected to the computer.

EMBODIMENT FOR CARRYING OUT THE INVENTION

Figure 1:
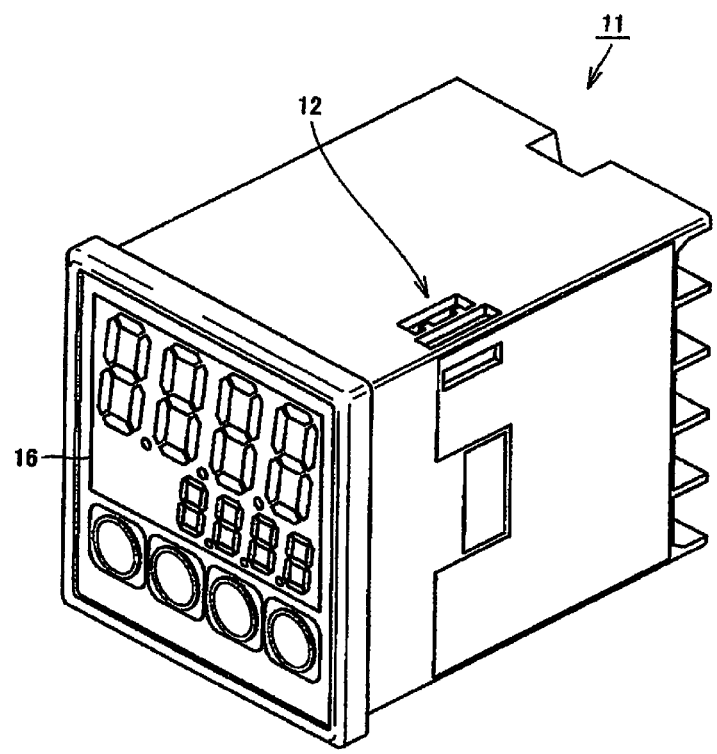
FIG. 1 is a perspective view showing a temperature controller according to one embodiment of this invention.

Hereinafter, a temperature controller according to one embodiment of this invention will be described with reference to the drawings. FIG. 1 is a perspective view showing a temperature controller 11 according to one embodiment of this invention. Referring to FIG. 1, the temperature controller 11 is connected for example to a thermocouple (not shown) and an operation panel for operating the heating of a heater, and adjusts a temperature in such a manner that an object becomes a target temperature by controlling the turning ON/OFF of a power source of the heater based on a measurement temperature inputted from the thermocouple.

The temperature controller 11 is capable of being connected to a personal computer via a USB cable. The temperature controller 11 is connected to the personal computer in order to preliminarily set information required for using the temperature controller 11 such as the target temperature. The temperature controller 11 is operated by supplying a power source from the personal computer at the time of being connected to the personal computer. That is, the temperature controller 11 is operated by bus power.

Meanwhile, normally, at the time of being used on site or the like, the temperature controller 11 is not connected to the personal computer but connected to a power point via a power cable. The temperature controller 11 is operated by supplying a voltage of 100 V of a general power source.

Figure 2:
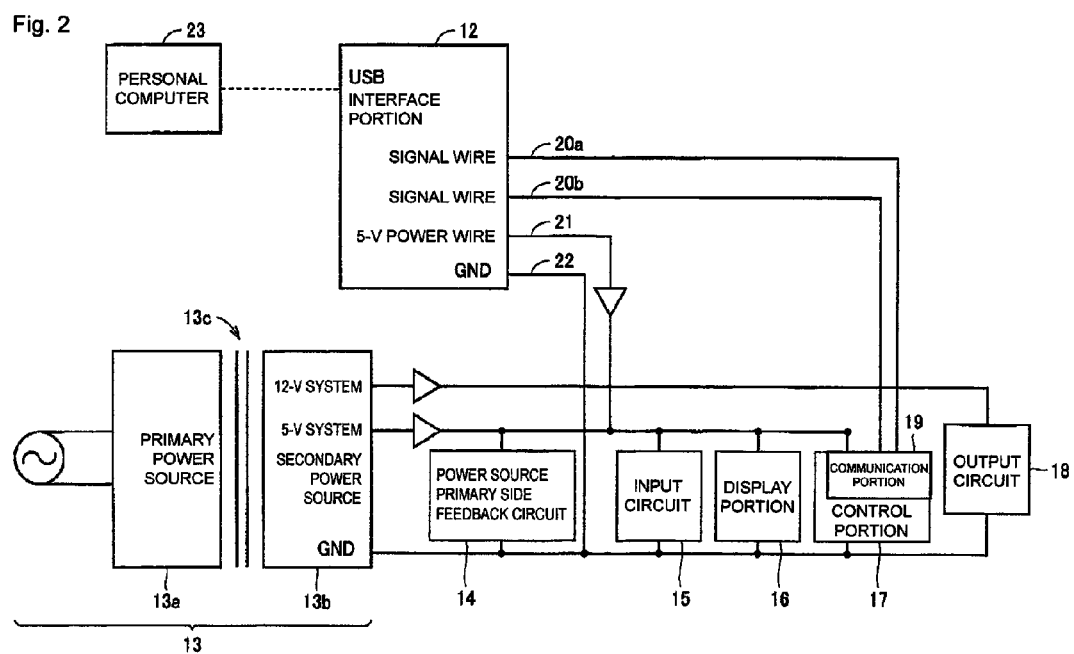
FIG. 2 is a block diagram showing a configuration of the temperature controller.

FIG. 2 is a block diagram showing a configuration of the temperature controller 11. Referring to FIGS. 1 and 2, the temperature controller 11 is provided with a USB interface portion 12 into which the USB cable is inserted, a power source portion 13, a feedback circuit 14, an input circuit 15, a display portion 16, a control portion 17, and an output circuit 18. At the time of being connected to the power point for outputting the general power source (100 V) via the power cable, the power source portion 13 steps down the voltage of 100 V of the general power source to voltages of 5 V and 12 V from a primary power source 13a to a secondary power source 13b via an insulation transformer 13c. The feedback circuit 14 performs feedback of the voltage of the general power source. The input circuit 15 receives an input of a temperature and the like from the thermocouple and the USB interface portion 12. The display portion 16 displays the temperature and the like inputted from the input circuit 15. The control portion 17 controls the entire temperature controller 11. The output circuit 18 relays and outputs a signal for controlling the turning ON/OFF of the power source of the heater.

The control portion 17 includes a CPU (Central Processing Unit), and controls the entire temperature controller 11. The control portion 17 also includes a communication portion 19 for controlling communication with a personal computer 23 and the like in an exterior performed via the USB interface portion 12.

The power source portion 13 includes a 5-V system for outputting 5 V serving as a first voltage for processing a digital signal, and a 12-V system for outputting 12 V serving as a second voltage for processing an analog signal in the secondary power source 13b. The feedback circuit 14, the input circuit 15, the display portion 16, and the control portion 17 are connected to the 5-V system. It should be noted that the output circuit 18 is connected to the 12-V system.

The USB cable is inserted into the USB interface portion 12, so that the temperature controller 11 and the personal computer 23 are connected. The USB interface portion 12 includes two signal wires 20a and 20b for inputting and outputting data, a 5-V power wire 21 for receiving the voltage of 5 V supplied from the personal computer 23 by the bus power for processing the digital signal, and a ground (GND) wire 22. The two signal wires 20a and 20b are connected to the communication portion 19, to transmit output data received from the communication portion 19 to the personal computer 23, and send data inputted from the personal computer 23 to the communication portion 19. The 5-V power wire 21 is connected to the 5-V system.

The feedback circuit 14 is connected to the 5-V system, and monitors a change in the voltage of 5 V. The feedback circuit adjusts the voltage of 5 V by facilitating supply of the power source by the general power source when the voltage of 5 V is a predetermined value or less, and pausing the supply of the power source by the general power source when the voltage is larger than the predetermined value. In such a way, the feedback circuit 14 performs the feedback of the voltage of the general power source. The predetermined value is specifically 4.9 V which is a value serving as a reference at the time of pausing supply of the general power source by the feedback circuit 14.

The input circuit 15, the display portion 16, and the control portion 17 are connected to the 5-V system as described above. Therefore, the input circuit 15, the display portion 16, and the control portion 17 are connected to the power point so as to be operated by supplying the voltage of 5 V from the general power source by the power source portion 13, and connected to the personal computer 23 so as to be operated by supplying the voltage of 5 V from the personal computer 23 by the 5-V power source wire 21.

Figure 3:
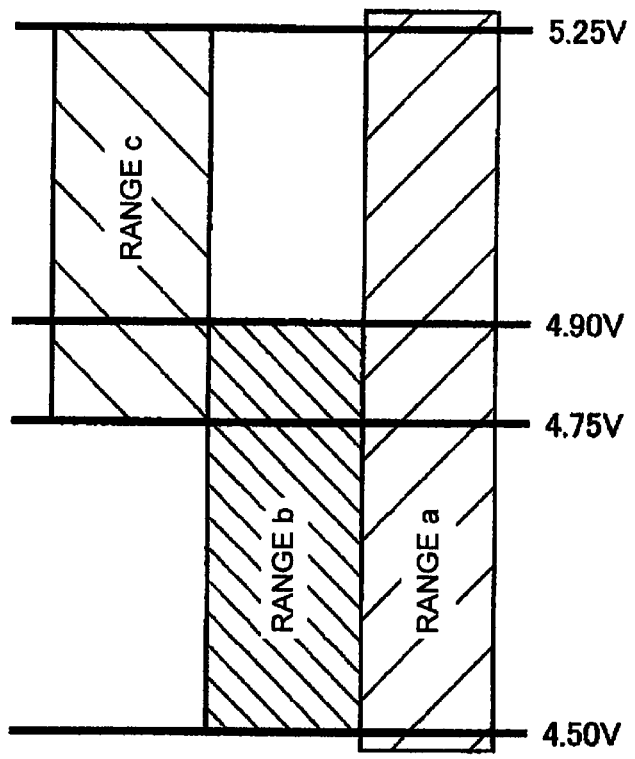
FIG. 3 is a view showing ranges of a voltage of operation.

Specifically, the voltage of 5 V supplied from the personal computer 23 is within a range of 4.5 V or more and 4.9 V or less as shown by a range b in FIG. 3. The voltage of 5 V supplied from the general power source by the power source portion 13 is within a range of 4.75 V or more and 5.25 V or less as shown by a range c in FIG. 3. That is, the voltage of the power source at the time of operating the input circuit 15, the display portion 16, and the control portion 17 is within a different range between a case where the voltage is supplied from the personal computer 23 and a case where the voltage is supplied from the general power source. The voltage supplied from the personal computer 23 is smaller than a predetermined value (4.9 V) serving as the reference at the time of pausing the supply of the general power source by the feedback circuit 14. That is, the voltage supplied from the personal computer 23 is within a range so as to avoid that the feedback circuit 14 performs the feedback. FIG. 3 is a view showing the ranges of the voltage within which the 5-V system (the input circuit 15, the display portion 16, and the control portion 17) is operated in the temperature controller 11. A range a is a range of the first voltage for processing the digital signal, that is, the range of the voltage of 5 V, which includes the voltage of the range b supplied from the personal computer 23 and the voltage of the range c supplied from the general power source by the power source portion 13, that is, 4.5 V or more and 5.25 V or less. It should be noted that since the range a has an upper limit value of +0.25, and a lower limit value of −0.25 in actual operation, the figure is in consideration with the fact.

Thereby, the voltage of the power source supplied from the personal computer 23 is smaller than the predetermined value serving as the reference at the time of pausing the supply of the general power source by the feedback circuit 14 in the temperature controller 11. Therefore, even in a case where the power source is supplied from the general power source at the time of connecting the temperature controller 11 to the personal computer 23, the feedback circuit 14 does not detect that the voltage of the power source supplied from the personal computer 23 exceeds the predetermined value. Therefore, at the time of connecting to the personal computer 23, the feedback circuit 14 does not lower the supply of the general power source. As a result, the temperature controller 11 can be stably operated at the time of being connected to the personal computer 23.

The voltage of the power source supplied from the personal computer 23 and the voltage of the power source supplied by the general power source are distinguished from each other in such a way. Thus, at the time of communicating with the personal computer 23 while receiving the supply of the power source by the general power source, the temperature controller 11 can be operated by the voltage of the power source supplied from the general power source. For example, in a case where the power cable is removed by mistake, the power source can be switched from the general power source to the power source supplied from the personal computer 23, and communication with the personal computer 23 is not stopped.

When the temperature controller 11 is connected to the personal computer 23, the display portion 16 is operated by the power source supplied from the personal computer 23. Therefore, in the temperature controller 11, there is no need for especially connecting the power cable to the power point so as to operate the display portion 16 after setting with using the bus power from the personal computer 23. As a result, convenience can be improved.

It should be noted that since the output circuit 18 is connected to the 12-V system, the output circuit is not operated when connected only to the personal computer 23 but operated in a case where the voltage of 12 V is supplied from the general power source.

The example that the feedback circuit 14 pauses the supply of the power source by the general power source when the voltage of 5 V is larger than the predetermined value is described in the above embodiment. However, the present invention is not limited to this but the supply of the power source by the general power source may be lowered.

The example that the temperature controller 11 is connected to the thermocouple and the operation panel for operating the heating of the heater so as to adjust the temperature is described in the above embodiment. However, the present invention is not limited to this but the temperature controller may be connected to a flow meter or a pressure meter so as to adjust a flow rate or pressure.

Although the embodiment of this invention is described above with reference to the drawings, this invention is not limited to the embodiment shown in the figures. Various corrections and modifications can be added to the embodiment shown in the figures within the same range as or equal range to this invention.

Industrial Applicability

This invention is effectively utilized in the temperature controller to which the power source by the bus power can be supplied and the power source from the power point can be supplied.

DESCRIPTION OF SYMBOLS

11 Temperature controller
12 USB interface portion
13 Power source portion
13a Primary power source
13b Secondary power source
13c Insulation transformer
14 Feedback circuit
15 Input circuit
16 Display portion
17 Control portion
18 Output circuit
19 Communication portion
20a, 20b Signal wire
21 5-V power wire
22 Ground wire
23 Personal computer

The invention claimed is:

1. A temperature controller capable of being connected to a computer without interruption of data processing, wherein
the temperature controller operable by a power source from the computer and operated by a general power source, wherein the temperature controller includes a first voltage for processing a digital signal,
the temperature controller comprises a feedback circuit configured to monitor a change in the first voltage flowing in the temperature controller, and
at the time of connecting to the computer, the controller responds by lowering the supply of power from the general power source when the first voltage exceeds a predetermined value and a voltage of the power source supplied from the computer is smaller than the predetermined value and greater than zero, so that data processing within the temperature controller is not altered by forming the connection between the temperature controller and the computer.

2. The temperature controller according to claim 1, wherein
a range of the first voltage is 4.5 V or more and 5.25 V or less,
the predetermined value is 4.9 V,
the voltage of the power source supplied from the computer is 4.5 V or more and less than 4.9 V, and
a voltage of the power source supplied from the general power source is 4.75 V or more and 5.25 or less.

3. The temperature controller according to claim 1, wherein the power source in the temperature controller further includes a second voltage for processing an analog signal.

4. The temperature controller of claim 3, wherein the second voltage comes solely from the general power source.

5. The temperature controller of claim 4, wherein the temperature controller continues to communicate with the computer when the general power source is disconnected from the temperature controller.

6. The temperature controller of claim 1, wherein the feedback circuit lowers the supply of the general power by pausing the supply from the general power source.

7. The temperature controller of claim 1, wherein the feedback circuit lowers the supply of the general power by lowering the supply from a primary side of the general power source.

8. The temperature controller of claim 1, further comprising a display portion wherein the general power supplies power to the display portion when the temperature controller is not connected to the computer and the display portion is solely powered by the computer when the temperature controller is connected to the computer.

9. The temperature controller according to claim 1, wherein the temperature controller simultaneously is powered from both the computer power source and the general power source.

10. A method for stably operating a temperature controller at the time of the temperature controller being connected to a computer, wherein the temperature controller is configured to operate with a power source from the computer and with a general power source and to use a first voltage for processing a digital signal, comprising the steps of:

setting a voltage of the power source supplied to the temperature controller from the computer to be smaller than a predetermined value, monitoring a change in the first voltage, detecting when the first voltage exceeds the predetermined value, and lowering the supply of the general power source when the first voltage exceeds the predetermined value, to allow connection to a computer without interruption of data processing.

11. A temperature controller capable of being connected to a computer without interruption of data processing during forming of the computer connection, comprising:

a general power source that provides digital power for digital signals and analog power for analog signal processing;

the digital power having a first voltage, and the analog power having a voltage;

a feedback circuit that senses externally connected 5 volt computer power and that controls supply of power from the general power source in response to sensed voltage of the 5 volt computer power upon connection to that power;

wherein, when the externally connected 5 volt computer power is smaller than a predetermined value and the first voltage is higher than the predetermined value upon connection of the temperature controller to the computer, the feedback circuit lowers the supply of the general power and wherein data processing within the temperature controller is not altered by forming the connection between the temperature controller and the computer.

12. The temperature controller of claim 11, wherein the feedback circuit lowers the supply of the general power by pausing the supply from the general power source.

13. The temperature controller of claim 11, wherein the feedback circuit lowers the supply of the general power by lowering the supply from a primary side of the general power source.

14. The temperature controller of claim 11, further comprising a display portion wherein the general power supplies power to the display portion when the temperature controller is not connected to the computer and the display portion is solely powered by the computer when the temperature controller is connected to the computer.

15. The temperature controller of claim 11, wherein the analog power comes solely from the general power source.

16. The temperature controller of claim 15, wherein the temperature controller continues to communicate with the computer when the general power source is disconnected from the temperature controller.

17. The temperature controller according to claim 11, wherein a range of the first voltage is 4.5 V or more and 5.25 V or less, the predetermined value is 4.9 V, the voltage of the power source supplied from the computer is 4.5 V or more and less than 4.9 V, and a voltage of the digital power supplied from the general power source is 4.75 V or more and 5.25 or less.

18. The temperature controller according to claim 11, wherein the temperature controller simultaneously is powered from both the computer power source and the general power source.

* * * * *